United States Patent [19]
Weeks

[11] Patent Number: 5,880,685
[45] Date of Patent: Mar. 9, 1999

[54] COMPUTER KEYBOARD WITH ACCESSORY PLATFORM

[76] Inventor: James A. Weeks, 119 Davenport Dr., Nashville, Tenn. 37217

[21] Appl. No.: 672,381

[22] Filed: May 28, 1996

Related U.S. Application Data

[63] Continuation-in-part of Ser. No. 372,394, Jan. 13, 1995, which is a continuation-in-part of Ser. No. 108,191, Jul. 23, 1993, abandoned.

[51] Int. Cl.$^6$ .................................................. H03K 17/94
[52] U.S. Cl. ........................ 341/22; 200/339; 345/167; 345/168; 364/709.15; 400/485; 400/488
[58] Field of Search ............................... 341/22; 345/157, 345/160, 167, 168; 364/709.15; 200/339, 5 A; 400/485, 488, 489; 455/89, 90, 128, 129, 347, 351, 95

[56] References Cited

U.S. PATENT DOCUMENTS

| | | | |
|---|---|---|---|
| 4,333,097 | 6/1982 | Buric et al. | 345/168 |
| 4,613,247 | 9/1986 | McGunnigle | 400/486 |
| 4,680,577 | 7/1987 | Straayer et al. | 345/168 |
| 4,891,777 | 1/1990 | Lapeyre | 364/709.15 |
| 5,043,721 | 8/1991 | May | 340/825.44 |
| 5,122,786 | 6/1992 | Rader | 341/22 |
| 5,200,913 | 4/1993 | Hawkins et al. | 345/168 X |
| 5,269,004 | 12/1993 | Comerford et al. | 341/22 X |
| 5,318,367 | 6/1994 | Braun | 341/22 |
| 5,372,441 | 12/1994 | Louis | 341/22 |
| 5,416,498 | 5/1995 | Grant | 341/22 |
| 5,469,160 | 11/1995 | Yang | 341/22 |
| 5,476,332 | 12/1995 | Cleveland, Jr. | 345/168 |
| 5,483,235 | 1/1996 | Hanson et al. | 341/22 X |
| 5,502,460 | 3/1996 | Bowen | 345/168 |

FOREIGN PATENT DOCUMENTS

| | | | |
|---|---|---|---|
| 2069197 | 8/1981 | United Kingdom | 341/22 |
| 2125199 | 2/1984 | United Kingdom | 341/22 |
| 18500 | 9/1993 | WIPO | 345/168 |

OTHER PUBLICATIONS

Concert Master™ Keyboard, NMB Technologies, Inc., date unknown.
Microsoft Natural Keyboard, Microsoft, date unknown.
Beausoleil et al., "Compact Keyboard", IBM Tech. Discl. Bull., vol. 13, No. 11, p. 3574, Apr. 1971.

Primary Examiner—Thomas J. Mullen, Jr.
Attorney, Agent, or Firm—Waddey & Patterson; I. C. Waddey, Jr.

[57] ABSTRACT

A keyboard for use with a computer is disclosed. The keyboard has an array of keys made up of four rows such that all keys are accessible by a user using finger and thumb movements of the user's hands without moving the hands from a central location. All modes and functions of the keyboard are accessible using finger movements also in that the character keys on the keyboards are capable of producing different characters or performing different functions when actuated in combination with other mode and function keys on the keyboard. The keyboard has a space bar and an enter key that are accessible by the user's thumbs. The space bar and enter key are actuated by pressing either key horizontally rather than vertically as in standard keyboards. The keyboard also includes dual mode keys which allow the user to access additional modes. This feature expands the capability of the keyboard to interact with more software functions. The keyboard also includes a trackball that is accessible using either of the user's thumbs with its three buttons accessible by the index finger of either hand. The front surface of the trackball lies in a plane perpendicular to the plane of the keyboard. The keyboard also includes visual aids on each key so that the user can correlate a given mode with the function it produces when used in conjunction with a multiple character function key. The keyboard also includes an accessory platform extending from below the array of keys and towards the user. The accessory platform can accommodate an electronic notepad and audio speakers. The keyboard also includes a detachable antenna that can be mounted on the keyboard for use or stored within the keyboard when not in use. The keyboard also includes a microphone mounted within the keyboard.

34 Claims, 3 Drawing Sheets

COMPUTER KEYBOARD WITH ACCESSORY PLATFORM

This application is a continuation-in-part of the pending U.S. patent application Ser. No. 08/372,394 for "SpeedKey-Board" which was filed on Jan. 13, 1995, which is a continuation-in-part of U.S. application Ser. No. 08/108,191, filed Jul. 23, 1993, now abandoned.

BACKGROUND OF THE INVENTION

The present invention relates generally to a computer or typewriter keyboard and more particularly to a computer keyboard capable of performing many functions.

Traditionally, typewriter keys have been placed on five rows, four alphabet/numeral/symbol key rows plus a space bar key row. All keys were within reach of the hands when positioned on the middle row, often referred to as the "home row", making rapid touch typing possible. Typically, the keys were spaced widely enough so that they could trigger the type keys mechanically. The typewriter keys were arranged in columns slanting from top left to bottom right.

This arrangement allowed the fingers of the right hand to operate comfortably in line with the arm. However, it required twisting the left wrist to the left out of line with the arm, a position more difficult to learn and less comfortable than the right-handed position. Computers, which no longer need to provide space for triggering type keys still use this awkward position of the left hand.

A typewriter has two modes, shift for capital letters, and unshifted for lower case letters. Thus, pressing the "a" key in the unshifted mode produces a lower case "a", while pressing the "a" key in the shift mode produces an "A".

Early computers added "function" mode keys, which added "temporary" functions that were not possible on typewriters. "Temporary" in this sense means effective only while being held down, such as a shift key being held down while an alphabetic key is struck. "Alternate" and "control" modes were added, further expanding keyboard capabilities with two more "full fledged" modes, that is, modes capable of temporary, locked, or direct operations ("direct operations" meaning to complete a command or sequence of commands). Initially, most keyboards possessed "alternate" and "control" keys only on one side of the keyboard. Additional alternate and control keys were placed on the other side of the keyboard on some computers to eliminate having to stretch one hand to access two separate keys. This layout was similar to the shift key, but unlike the shift key, the alternate and control keys generally could not be placed in matching locations due to the traditional arrangement of keys.

The next additions to keyboards were ten "F" (function) keys placed in two vertical rows on the left side of the keyboard, and/or twelve such keys placed in a single row of smaller keys above the top standard row of keys. The ten or twelve modes provided by these keys were also capable of "full fledged" usage.

Most keyboards in this stage also had a set of keys on the right side which operated in three modes: unshifted for cursor control, control for temporary numerals, and numeral lock for numeral usage. Cursor controls were later placed on a separate pad. Additional keys, such as escape, scroll lock, print screen, etc., were added on the right side of the keyboard so that desktop keyboards, which were formerly about 11" long, are now at least 18" long. The length of the keyboard requires even touch-typists to constantly look away from any copy to "hunt and peck" any keys not within reach of the home hand positions and hunt and place their hands back on their home positions. This process complicates and slows down the use of the keyboard. This is especially true in the case of children who are learning to type.

Since the extended keyboard had cursor control keys which could move the cursor only horizontally, vertically, and to beginning and end of documents, a mouse, or trackball device, capable of moving the cursor 360° was attached to the keyboard. Initially, these devices were attached to the keyboard by a wire and called a mouse. Then these devices were attached or incorporated into the keyboard in various locations. This has resulted in the increase in shifting between the home row key positions and the trackball or mouse to access the increasingly complex screens and additional functions assigned to the mouse or trackball.

In earlier keyboard models and now on the keyboards of portable or laptop computers, a numeral pad is superimposed on the right hand alphabet/numeric keys. In the smaller computer keyboards this was done to reduce keyboard size. The other mathematical symbols (#, $, %, &, *, (, +, −, etc.) are in their traditional location. This arrangement requires moving the hand up a row from its normal position to access the 7, 8, 9, and 0 keys.

The end result of this process of adding keys and devices piecemeal to a keyboard while retaining the keyboard's standard left-hand key pattern is that operators must stretch their left hand to access widely separated keys, look away from the copy to guide their hands away from and back to the home row key positions, and guide the cursor over an increasingly complex screen. Any or all of these problems greatly impair rapid rhythmic keyboarding.

Electronic notepads have been developed that allow the user to enter and process data using a pen. Additionally, computer systems now include radio antennae to facilitate "on-line" communication between computers; microphones to facilitate voice interaction with computer programs; and stereo speakers to enhance the sound effects of computer games, CD-ROM products and the like. Attempts to integrate these devices into a computer keyboard would only aggravate the problems described above.

What is needed, then, is a keyboard that is capable of efficiently handling current computer usage and that is capable of accommodating newly developing computer related devices. Such a keyboard is presently lacking in the prior art.

SUMMARY OF THE INVENTION

It is an object of this invention to provide a keyboard with a substantially reduced number of keys/controls as compared to those of the prior art.

It is a further object of this invention is to provide a compact keyboard for either desktop or portable use, eliminating the need to constantly adjust to differing keyboards for those who use both.

It is yet a further object of this invention to provide a keyboard that is symmetrical so it can be scaled down for children or smaller adult hands.

It is still a further object of this invention to provide a keyboard that increases the number of modes available but yet provides access to these modes with fewer strokes than prior art keyboards.

Still a further object of this invention is to provide a keyboard that keeps all keys and controls within easy, rapid, accurate reach of the restfully supported hands on the home row hand position, thus eliminating the need to look away, search for a key, then search again to locate and return to the home hand position, which results in wasted time and effort and reduced accuracy.

Yet a further object of this invention is to correct the flaw in the prior art arrangement of the left hand character/function keys, eliminating the strain of using fingers out of line with the arm.

It is still a further object of this invention to provide a keyboard with an antenna for radio wave input that can be detached and stored if desired; with a microphone for voice input; and with dual speakers for stereo sound output.

It is yet a further object of this invention to provide a keyboard that includes an platform for accessories, including a notepad for pen-based computing.

It is yet a further object of this invention to provide a keyboard that includes keys that are labeled with lower-case letters.

The keyboard of this invention includes a surface in a first plane and a second surface in a second plane, the first plane substantially perpendicular to the second plane. By "substantially perpendicular", it is meant that the planes can be in a range of from substantially 85 degrees to as much as 120 degrees or more to each other. The keyboard has an array of keys in which some keys are actuated by movement perpendicular to the first plane and some keys are actuated by movements perpendicular to the second plane. The array of keys is preferably laid out such that a user can actuate all keys using finger and thumb movements while keeping his/her hands on a central hand location, such as a standard home row hand location. The keys accessible by the user's left hand can also be aligned such that the user's left hand will be aligned with the user's left arm when these keys are accessed.

The keyboard of this invention includes a platform extending away from the array of keys. The platform is used to facilitate the mounting of accessories on the keyboard. A mounting area can be formed in the platform. An electronic notepad can be mounted within the mounting area. Preferably, the platform extends toward the user and the mounting area is centrally located on the platform between the user and the array of keys. A pair of audio speakers can also be mounted within the platform.

Means for mounting an antenna can also be positioned on a surface of the keyboard. An antenna can be fixedly mounted or detachably mounted to the means for mounting the antenna.

When the antenna is detachably mounted to the keyboard, the keyboard further includes an antenna storage compartment formed within the keyboard and means for securing the antenna in the antenna storage compartment. A microphone can also be mounted within the keyboard.

Preferably, the array of keys comprises four rows, a top row of keys including a plurality of character/function keys and at least one service key at least one end of the top row; a second row of keys below the top row, the second row of keys including a plurality of character/function keys and at least one mode key at at least one end of the second row; a third row of keys below the second row, the third row of keys including a plurality of character/function keys and at least one mode key at at least one end of the third row; and a bottom row of keys just below the third row, the bottom row of keys including a plurality of mode keys, with at least one mode located at at least one end of the bottom row, the bottom row also including at least one service key.

When the array of keys comprises four rows, adjacent mode keys in the bottom row and adjacent mode keys at the ends of the rows have been modified to define a plurality of single level dual mode keys and a plurality of dual level dual mode keys. Additionally, an LED display area is centrally located within the top row of keys, the LED display area indicating a status of activity.

The keyboard can also include labels that bear lower-case letters.

DESCRIPTION OF THE PREFERRED EMBODIMENT

This invention is a keyboard and electric signal device for use with a computer, hereinafter referred to as a "keyboard". The term "computer" is meant to refer to any data management device or system that is used in word processing, number processing and information management. Any references made to right and left, top and bottom, or the like are made for clarity of description and should not be construed as limitations on this invention.

Referring now to the drawings, wherein like numerals refer to like structures throughout, the keyboard itself is generally referred to by the numeral 10. Referring particularly to FIGS. 1, 2, 3 and 7, keyboard 10 includes an array 100 of four rows of keys: a top row 102, a second row 104, a third row 106, and a bottom row 108. These rows are supported by key support means 11. As seen more clearly in FIG. 3, the key support means 11 includes an upper planar surface 12 and a facing planar surface 13 which is substantially perpendicular to upper planar surface 12. The rows of keys 102, 104, and 106 are located in upper planar surface 12. Some keys of the bottom row 108 of keys extend outwardly from facing planar surface 13, while other keys in bottom row 108 lie on upper planar surface 12. Particularly, the three central keys in bottom row 108, the Enter service key 14, the TrackBall 15, and the Space service key 16 extend outwardly from the facing planar surface 13, and are actuated by movement perpendicular to the planar surface 13.

Figure 1:
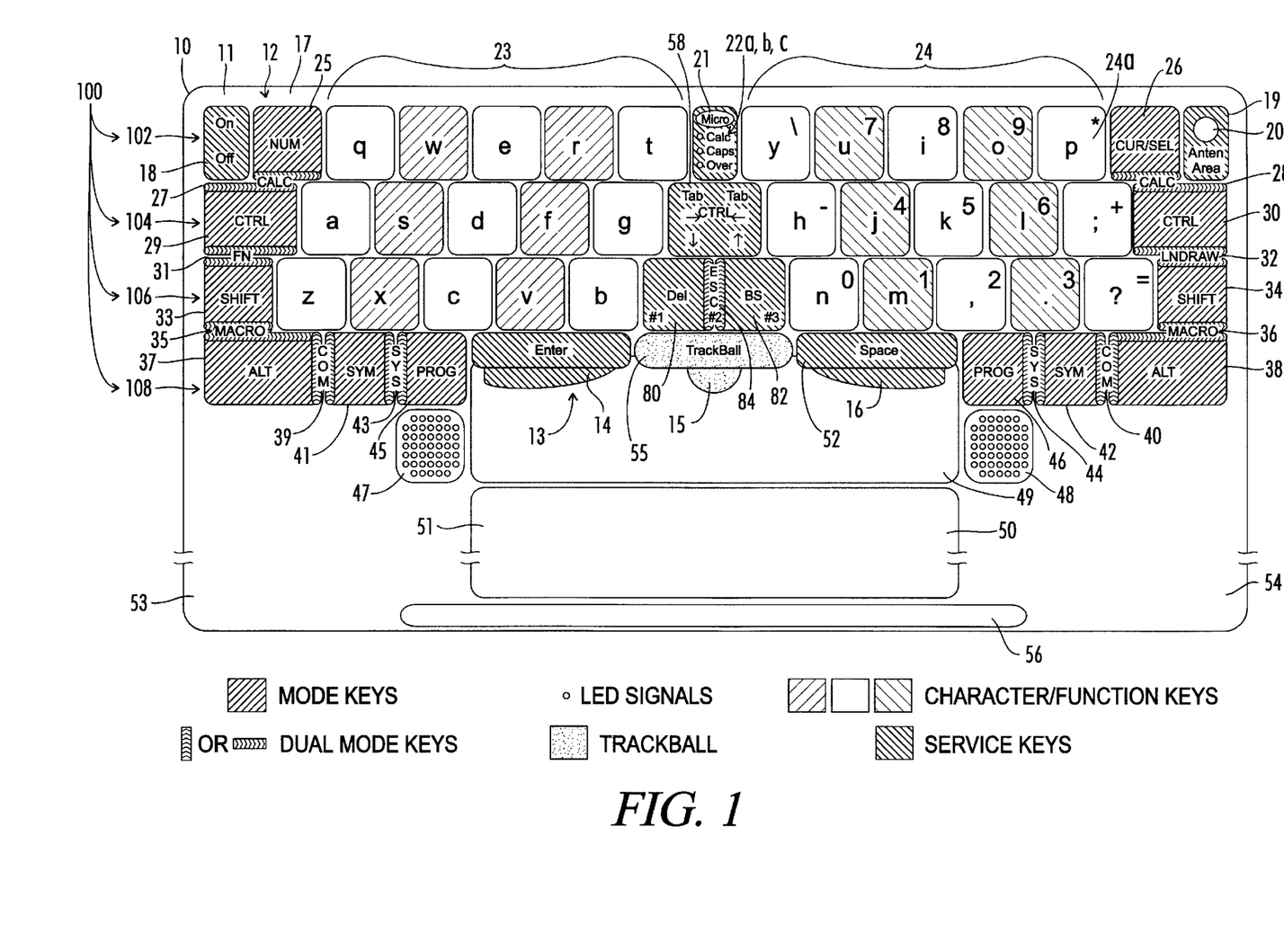
FIG. 1 is a top view of the computer keyboard of this invention.
Figure 7:
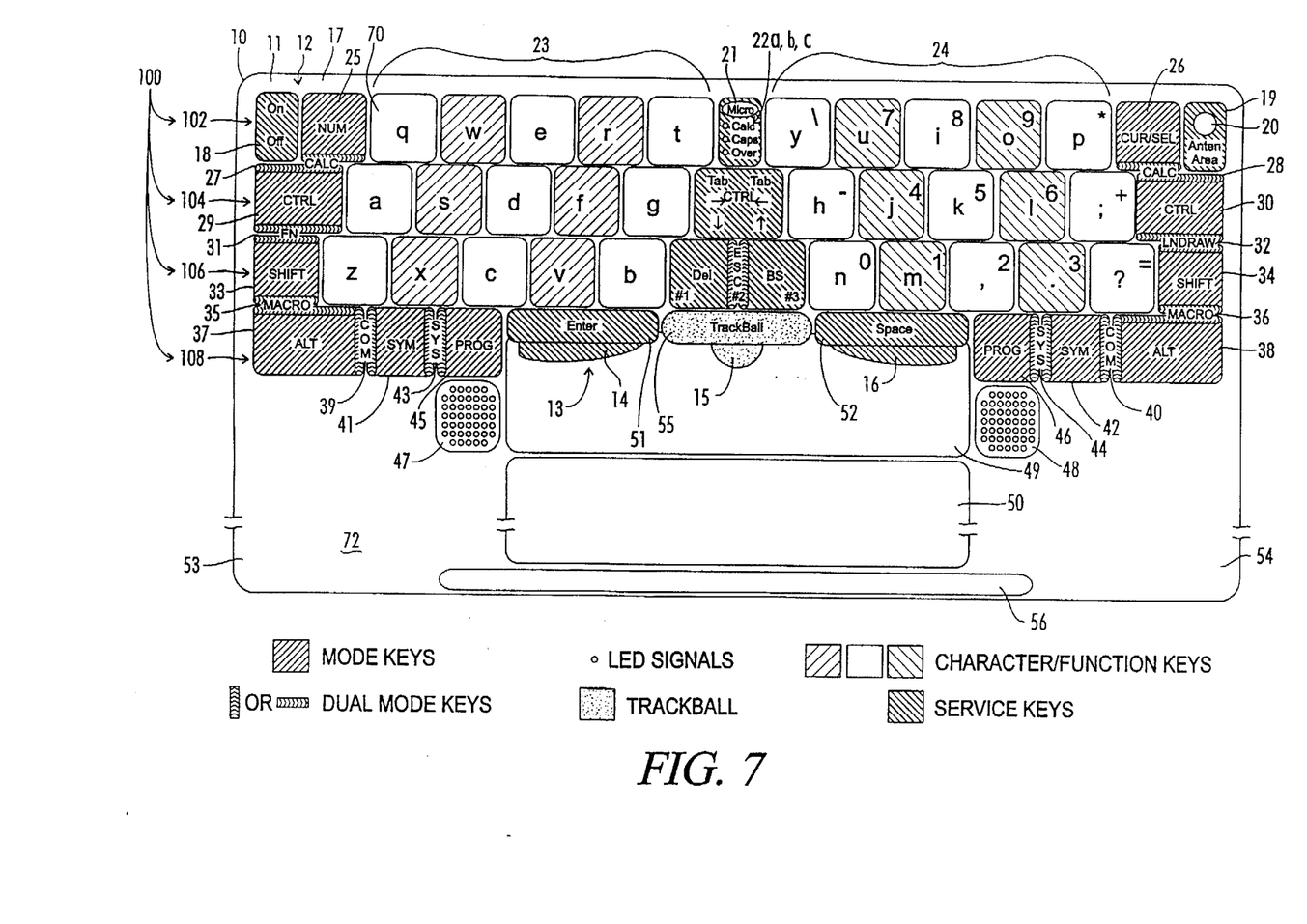
FIG. 7 is a top view of an alternative embodiment of the computer keyboard of this invention.

Continuing on with FIGS. 1 and 7, and referring to the top 17 of the keyboard 10, there is an On/Off key 18 at the left end of row 102 that glows when the computer is "on". Placing the On/Off key 18 on the surface 12 of the keyboard 10 makes it more visible and accessible than in the prior art. The On/Off key 18 can be coordinated with software to prevent inadvertent shut down of the computer. As an example, software can be provided such that when On/Off key 18 is pressed, a menu appears on the screen with these choices: "Shut down", "Cancel", and "Restart", the default choice being "Shut down". If "shut down" is chosen, the software will provide the opportunity to save any open files before the system is shut down.

The positioning of the On/Off button as a key on the keyboard is a significant time-saving improvement over the prior keyboards. In the prior keyboards, accessing the Restart or Reset key required moving both hands from and back to the home position after using two hands and three keys: Control, Alternate and Delete.

At the right end of row 102 in mirror image position to On/Off key 18 there is an antenna area 19 which provides space for mounting a radio antenna. Means for mounting an antenna, such as antenna base plate 61 (not visible in FIG. 1), are placed within keyboard 10 below area 19. An antenna base plug 20 occupies area 19 when no antenna is mounted there.

In the center of row 102 there is microphone 21 and a set of LED's (light emitting diodes) 22, each of which glows when its mode is in use. From top to bottom in this embodiment, these LED's are related to the numeral (NUM) mode 22a, the shift (CAPS) mode 22b, and to the Overstrike (OVER), or typeover, function 22c.

Multiple character/function keys 23, 24 comprise five keys between the center and ends of each of rows 102, 104, and 106 of keys, the combination of keys and rows forming an array of keys. There are therefore 15 left hand multiple character/function keys 23 and 15 right hand multiple character/function keys 24 in the array of keys. FIG. 1 displays multiple character/function keys 23, 24 in a symmetrical layout. Preferably, multiple character/function keys 23, 24 are ¾ of an inch square and the keyboard 10 itself is 11 inches long from left to right. Because of the symmetry, the keyboard 10 can be scaled down if desired so that it could be used more readily by a child typist, for example.

The left hand multiple character/function keys 23 are arranged in columns slanting upwards from lower left to middle center which allows the user to access these keys while keeping the left hand in line with the left arm. This feature enables the fingers of the left hand to access keys as naturally and rapidly as do the fingers of the right hand. The fifteen (15) right hand multiple character/function keys 24 are arranged in columns slanting upward from lower right to middle center.

The function/character keys 23 and 24 can be arranged in "Qwerty", "Dvorak", or in any other format. The preferred embodiment of the invention uses the "Qwerty" format. Thus, there is no change in the assignment of alphabetic letters to each finger, a great help in adjusting to this new keyboard. Unlike prior art keyboards, which display upper case letters on the keys and yet produce lower case letters unless changed by accessing the SHIFT mode, keyboard 10 more logically displays lower-case letters on the labels 70 of the keys. Labels 70 also include examples of other character and functions that keys 23, 24 can be set up to produce or perform.

Continuing on with FIGS. 1, 2, 3, 5 and 7, examples of mode keys are displayed. The names of the mode keys reflect names for keyboard modes that are standard in the art and should be considered as illustrative rather than as requirements for the name of the mode keys. Additionally, adjacent mode keys are modified to allow the user to access two modes by pressing with one finger the easily recognizable groove or ridge they share. This feature creates a dual mode key, which provides for an additional mode. Single level dual mode keys lie on the same row. Dual level dual mode keys span two adjacent rows.

The adjacent mode keys are modified by forming a 45° notch (FIGS. 1, 2 and 3) in or a 45° ridge (FIG. 5) on each of the keys. Dual level dual mode keys are formed as follows.

ConTRoL mode key 30 has a notched projection 60 (see FIG. 2) extending upward from the edge of ConTRoL key 30 that lies adjacent to CUR/SEL key 26. A notch 62 is formed on the edge of CUR/SEL key 26 that lies adjacent to ConTRol key 30. Notched projection 60 and notch 62 define a groove 66 that the user's fingers can easily find. Groove 66 thus makes access convenient to the CALCulator dual level dual mode key 28. ConTRoL mode key 30 and SHIFT mode key 34 are similarly modified to include notched projection 60 and notch 62 to provide a groove 66 for access to the LNDRAW dual level dual mode key 32. SHIFT mode key 34 and ALTernate mode key 38 are similarly modified to include notched projection 60 and notch 62 to provide a groove 66 for access to the MACRO dual level dual mode 36.

Continuing on FIG. 2, single level dual mode keys are formed as follows. ALTernate mode key 38 has a notch 62 formed in the edge of ConTRoL key 30 that lies adjacent to SYMbol mode key 42. A notch 62 is formed on the edge of SYMbol mode key 42 that lies adjacent to ALTernate mode key 38. Notches 62 define a groove 66 that the user's fingers can easily find. Groove 66 thus makes access convenient to the COMmunications single level dual mode key 40. PROGram mode key 46 and symbol mode key 42 are similarly modified to include notches 62 to provide a groove 66 for access to the SYStem single level dual mode key 44. While grooves 66 are used to access dual mode keys in the preferred embodiment of the invention, ridges 68 could be used instead (see FIG. 5). Additionally, the single level and dual level dual mode keys on the left side of keyboard 10 are formed in the same manner as those on the right side of the keyboard 10, described above.

The preferred layout of the mode keys is best seen in FIGS. 1 and 7. To the right of the On/Off key 18 on row 102 is the NUMeral mode key 25. The CURsor/SELect mode key 26 is located in a mirror image position to NUMeral mode key 25 on the opposite side of row 102.

The CALCulator dual level dual mode key 27 is located on the left side of the keyboard 10 between rows 102 and 104. CALCulator dual level dual mode key 28 is located in a mirror image position to CALCulator dual level dual mode key 27 on the right side of the keyboard between rows 102 and 104.

ConTRoL mode key 29 is located on the left end of row 104. ConTRoL mode key 30 is located in a mirror image position to ConTRoL mode key 29 on the right end of row 104. The FunctioN dual level dual mode key 31 is located at the left end of the keyboard 10 between rows 104 and 106. The LNDRAW dual level dual mode key 32 is located in a mirror image position to FunctioN dual mode key 31 between rows 104 and 106 on the right end of rows 104 and 106. The SHIFT mode key 33 is located on the left end of row 106, and its mirror opposite SHIFT mode key 34 is located on the right end of row 106.

The MACRO dual level dual mode key 35, is located between rows 106 and 108 at the left end of rows 106 and 108, and MACRO dual level dual mode key 36 is located between rows 106 and 108 at the right end of rows 106 and 108 in a mirror image position to MACRO dual level dual mode key 35. The ALTernate mode key 37 is located on the left end of row 108, and its mirror opposite ALTernate mode key 38 is located at the right end of row 108.

The COMmunication single level dual mode key 39 is located to the right of ALTternate mode key 37 on row 108. COMmunication single level dual mode key 40 is located in a mirror image position to COMmunication single level dual mode key 39 at the right end of row 108. The SYMbol mode key 41 is located to the right of COMmunication single level dual mode key 39 on row 108, and SYMbol mode key 42 is located in a mirror image position to SYMbol mode key 41 at the right end of row 108.

The SYStem single level dual mode key 43 is located to the right of the SYMbol mode key 41 on row 108. SYStem single level dual mode key 44 is located in a mirror image position to SYStem single level dual mode key 43 on the right side of row 108. The PROGram mode key 45 is located to the right of the SYMbol key 41 on row 108. PROGram mode key 46 is located in a mirror image position to PROGram mode key 45 on the right side of row 108.

Figure 2:
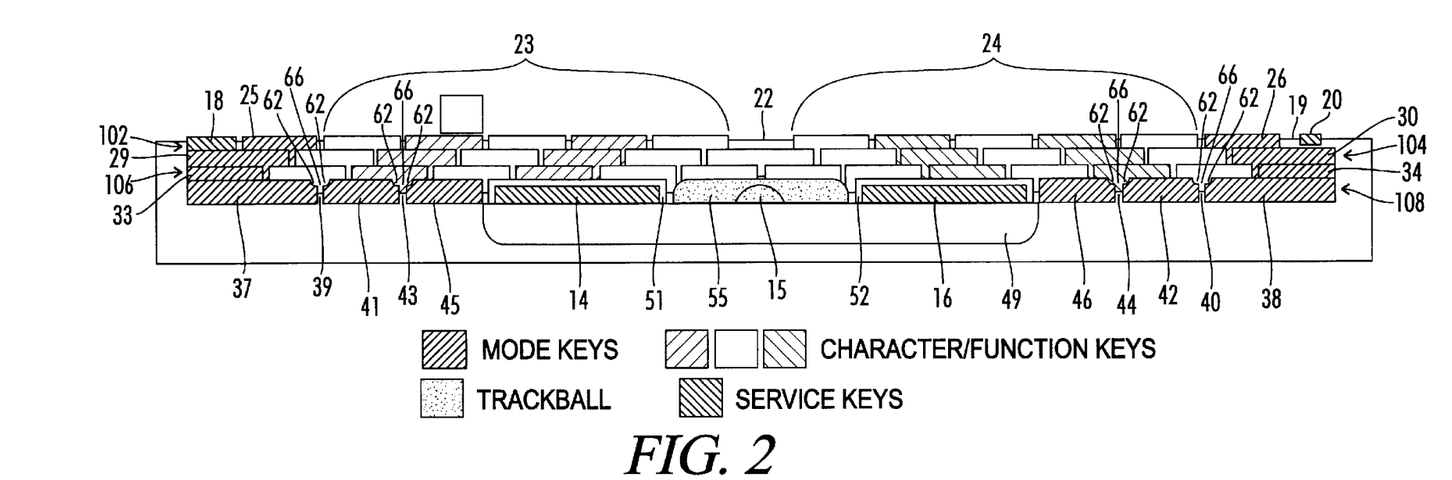
FIG. 2 is a front elevation of the computer keyboard.
Figure 3:
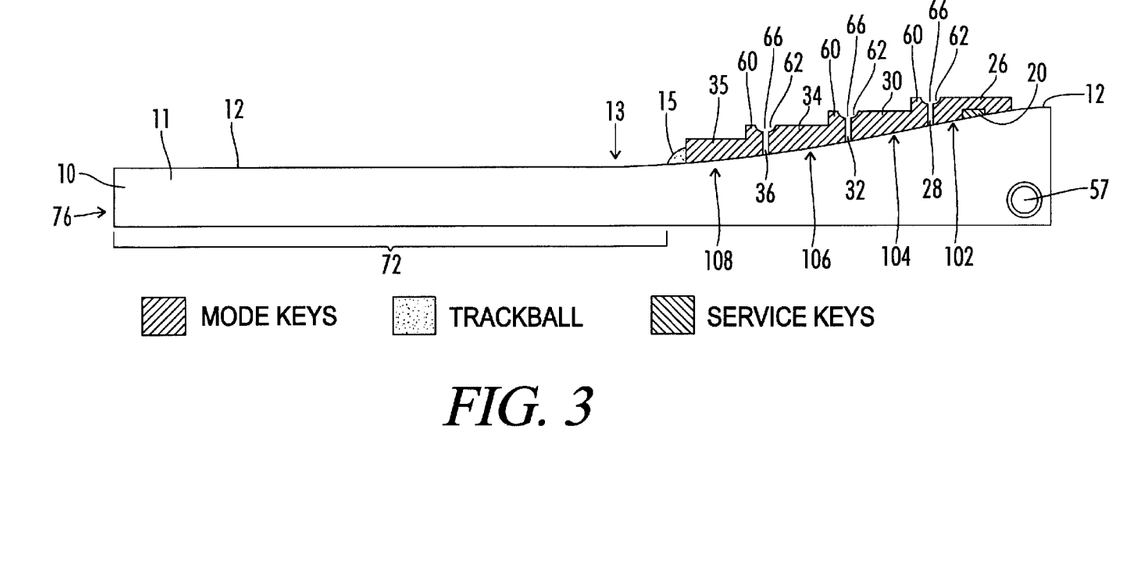
FIG. 3 is a right end elevation of the computer keyboard.

Continuing on FIGS. 1, 2 and 3, centrally located on row 106 are the DELete and BackSpace keys 80, 82. An ESCape key 84 is formed between DELete and BackSpace keys 80, 82 in the same manner as described above for single level dual mode key. These keys can be set up to serve as clicker buttons for the TrackBall 15. Centrally located in row 108 are the Enter service key 14, TrackBall 15, and Space service key 16, which are actuated by movement perpendicular to the second plane 13 and into their casings 51, 55, and 52, respectively.

Figure 4:
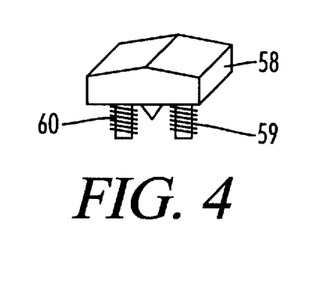
FIG. 4 is a depiction of the rocker tab when not installed in the computer keyboard.
Figure 5:
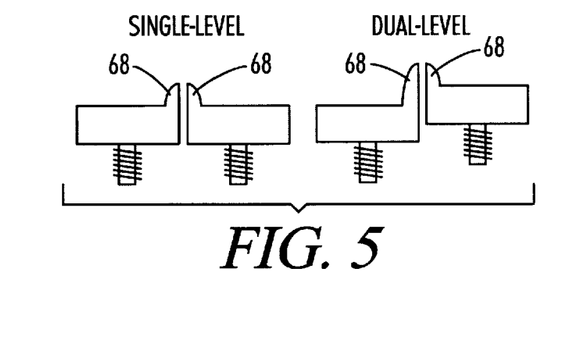
FIG. 5 is a depiction of the ridged dual level and single level dual mode keys.

Referring now to FIGS. 1 and 4, a rocker tab key 58 with mounting posts 59 and springs 60 is depicted. As best seen in FIG. 1, rocker Tab key 58 is centrally located in row 104, and thus, is more conveniently located than the Tab keys in prior art keyboards. Rocker Tab key 58 can be set up to allow the user to tab in either direction, depending on which side of the key is pressed.

Referring now to FIGS. 1, 2, 3 and 7, an accessory platform 72 extends away from bottom row 108 and towards the user of keyboard 10. Left-side speaker 47 and right-side speaker 48 are mounted on accessory platform 72 just below PROGram keys 45 and 46, respectively. An indented area 49 is formed in the center of platform 72, between speakers 47 and 48. Indented area 49 provides room for the thumbs of the user to access the Enter key 14, TrackBall 15, and Space key 16 from a more natural, relaxed position.

A mounting area 50 is formed in platform 72 in a central position, just below the indented area 49. An electronic notepad 51 is mounted into area 50. On either side of the notepad 51 are the areas for the left-hand 53 and right-hand 54 palm rests. A channel 74 is formed in platform 72 between notepad 51 and the margin 76 of platform 72. Channel 74 is used for temporarily storing the stylus 56 for notepad 51.

Optionally, by omitting the hand rests and notepad, a lighter weight, half-sized keyboard, about 4¼×11", can be produced without losing any of the keyboard advantages.

Figure 6:
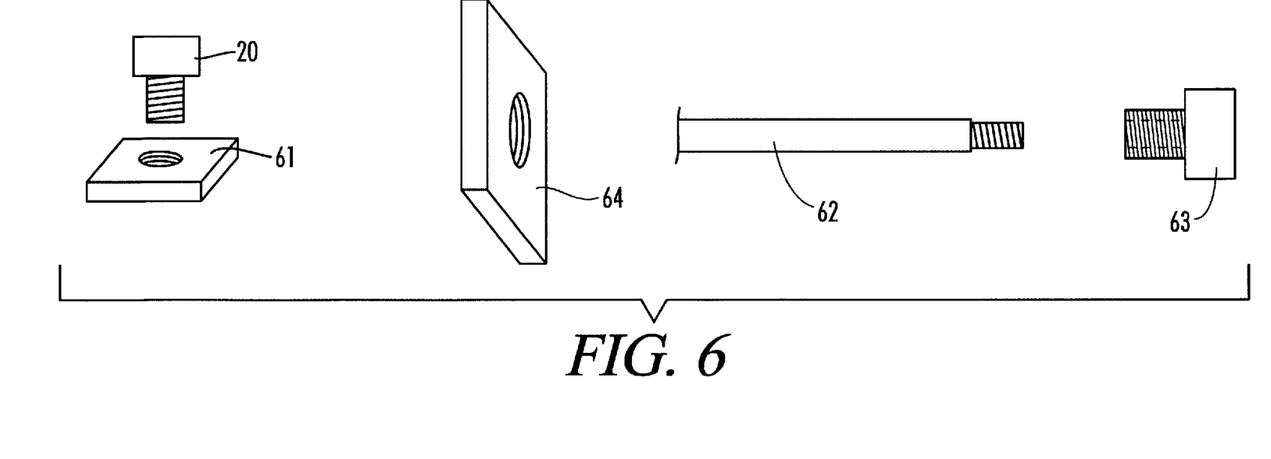
FIG. 6 is an exploded view of the antenna of the keyboard of this invention.

Referring now to FIGS. 1 and 6, a radio antenna 162 can be permanently or attachably mounted at antenna area 19 in the upper right of keyboard 10. Preferably, antenna 62 is detachable so it can be used on portable or desktop computers. Antenna 62 is thus provided with threads at its bottom end to provide for attachment and detachment.

In FIG. 1, antenna base plug 20 is threaded into the Antenna Base 61 (not visible in FIG. 1) which is fixedly attached beneath antenna area 19 within key support means 11. Antenna 62 is attached by removing antenna base plug 20 from antenna base 61 and threading antenna 62 into antenna base 61. As would be obvious to one having ordinary skill in the art, the computer using keyboard 10 would include a means of recording incoming radio and other electronic device signals in order to effectively use antenna 62.

When not in use, antenna 62 is stored inside keyboard 10 by placing it top end first into opening 57 that is formed in the right lateral surface of key support means 11. The threaded bottom end of antenna 62 is threaded into the antenna storage plug 63, which in turn is threaded into the antenna storage base 64 that is fastened permanently behind opening 57. When antenna 62 is in use, antenna base plug 20 can be stored by threading it into the antenna storage plug 63, which is then threaded to the Antenna Storage Base 64.

FIG. 7 depicts an alternative embodiment of the keyboard of this invention. In FIG. 7, labels 70 include lower-case letters. This feature is more logical than previous labeling of keyboards in that pressing the individual keys alone, without using a shift key or mode key, produces a lower-case letter.

The features of the keyboard of this invention can be adapted for use in various software using ordinary skill in the design of software. For example, the ConTRoL mode keys 29 and 30 can be set up to control all thirty (30) multiple character/function keys. Thus, when the multiple character/function keys are actuated in conjunction with ConTRoL mode keys 29 and 30, the keys can perform direct commands like Bold, Italic, Underline, etc. immediately without requiring further input.

The NUMeral mode key 25 can be set up to enable the right side multiple character/function keys 24 to produce numerals and mathematical symbols. Indeed, if right side multiple character/function keys 24 are set up as in FIG. 1, no movement away from the "home row" hand position is required to access the 7, 8, 9, and 0 keys. Numeral mode key 25 can be set up so that pressing the mode key twice in succession locks the mode until it is pressed once again to unlock it or until ESCape is accessed.

The CURsor/SELect mode key 26 can be set up so that accessing this mode once moves the cursor to the location indicated by labels 70 on a key chosen from the left side multiple character/function keys 23. CURsor/SELect mode key 26 can be further set up so that accessing this mode twice in succession places the system in the SELect mode. In a word processing program, for example, the user can select a range of text in Select mode for manipulation by moving the cursor using the left side multiple character/function keys 23. This range of text may then be manipulated by a direct command such as all-caps, bold, copy, delete, italic, underline, etc.

The keyboard of this invention reduces the number of keys of the keyboard from 101–104 in the prior art to 62, while still providing enough key combinations to manipulate current and foreseeable computer operations. Such operations include manipulations of devices such as Infrared optical readers, radios, TVs, CD-ROMs, Modems, Internet services, LANs, printers and the like. Such operations also include manipulations of programs in the system, such as CAD (Computer aided drawing), Data bases, PIM (program information managers), Presentations, Word Processors and the like. All of the characters/functions described in the foregoing can be accessed by the keyboard user with finger and thumb movements only, except for handwriting/drawing on the electronic notepad. Even when using the electronic notepad, the user's hand is still proximate to the "home row" hand position.

Thus, although there have been described particular embodiments of the present invention of a new and useful Computer Keyboard with Accessory Platform, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A keyboard for use with a computer, the keyboard including a surface in a first plane and a surface in a second plane, the first plane substantially perpendicular to the second plane, the keyboard having an array of keys in which some of the keys are actuated by movement substantially perpendicular to the first plane and some of the keys are actuated by movement substantially perpendicular to the second plane, the keyboard also including a platform extending away from the array of keys said platform including an upper relatively flat surface lying in a plane substantially parallel to said first plane with an indented area in said upper surface, with the keys actuated by movement substantially perpendicular to the second plane extending into said indented area.

2. The keyboard according to claim 1 further comprising a mounting area formed in the platform.

3. The keyboard according to claim 2 wherein the platform extends toward the user and the mounting area is centrally located on the platform between the user and the array of keys.

4. The keyboard according to claim 1 further comprising a pair of audio speakers mounted within the platform.

5. The keyboard according to claim 1 further comprising a microphone mounted within the keyboard.

6. The keyboard according to claim 1 wherein the array of keys comprising four rows, a top row of keys including a plurality of character/function keys and at least one mode key at at least one end of the top row; a second row of keys below the top row, the second row of keys including a plurality of character/function keys and at least one mode key at at least one end of the second row; a third row of keys below the second row, the third row of keys including a plurality of character/function keys and at least one mode key at at least one end of the third row; and a bottom row of keys just below the third row, the bottom row of keys including a plurality of mode keys, with at least one mode they located at at least one end of the bottom row, the bottom row also including at least one service key.

7. The keyboard according to claim 6 wherein adjacent mode keys in the bottom row and adjacent mode keys at the ends of the rows have been modified to define a plurality of single level dual mode keys and a plurality of dual level dual mode keys.

8. The keyboard according to claim 6 wherein an LED display area is centrally located within the top row of keys, the LED display area indicating a status of activity.

9. The keyboard according to claim 1 wherein the keys include labels that bear lower-case letters.

10. A keyboard for use with a computer, the keyboard including a surface in a first plane and a surface in a second plane, the first plane substantially perpendicular to the second plane, the keyboard having an array of keys in which some of the keys are actuated by movement substantially perpendicular to the first plane and some of the keys are actuated by movement substantially perpendicular to the second plane, the keyboard also including a platform extending away from the array of keys and further comprising means for mounting an antenna positioned on a surface of the keyboard.

11. The keyboard according to claim 10 further comprising an antenna fixedly mounted to the means for mounting the antenna.

12. The keyboard according to claim 10 further comprising an antenna detachably mounted to the means for mounting the antenna.

13. The keyboard according to claim 12 further comprising an antenna storage compartment formed within the keyboard and means for securing the antenna in the antenna storage compartment.

14. A keyboard for use with a computer, the keys of the keyboard consist of:
   a. a first key group consisting of a plurality of manually actuable character/function keys capable of producing different characters or performing different functions when actuated in combination with other types of keys on the keyboard;
   b. a second key group consisting of a plurality of manually actuable mode keys;
   c. a third key group consisting of a plurality of manually actuable service keys; and
   d. a key support means for supporting the character/function keys, the mode keys, and the service keys in an array, the array of keys consisting of said first key group, said second key group and said third key group, and being such that a user can actuate all keys using the fingers of the user's hands without having to move the user's hands from a central hand location.

15. The keyboard according to claim 14 further including a platform extending from the key support means and a mounting area formed in the platform.

16. The keyboard according to claim 15 wherein the platform extends toward the user and the mounting area is centrally located on the platform between the user and the array of keys.

17. The keyboard according to claim 15 further comprising an electronic notepad mounted within the mounting area.

18. The keyboard according to claim 14 further including a platform extending from the key support means and a pair of audio speakers mounted within the platform.

19. The keyboard according to claim 14 further comprising means for mounting an antenna positioned on a surface of the keyboard.

20. The keyboard according to claim 19 further comprising an antenna fixedly mounted to the means for mounting the antenna.

21. The keyboard according to claim 19 further comprising an antenna detachably mounted to the means for mounting the antenna.

22. The keyboard according to claim 21 further comprising an antenna storage compartment formed within the keyboard and means for securing the antenna in the antenna storage compartment.

23. The keyboard according to claim 14 further including a microphone mounted within the keyboard.

24. The keyboard according to claim 14 wherein the array of keys comprising four rows, a top row of keys including a plurality of character/function keys and at least one mode key at at least one end of the top row; a second row of keys below the top row, the second row of keys including a plurality of character/function keys and at least one mode key at at least one end of the second row; a third row of keys below the second row, the third row of keys including a plurality of character/function keys and at least one mode key at at least one end of the third row; and a bottom row of keys just below the third row, the bottom row of keys including a plurality of mode keys, with at least one mode located at at least one end of the bottom row, the bottom row also including at least one service key.

25. The keyboard according to claim 24 wherein adjacent mode keys in the bottom row and adjacent mode keys at the ends of the rows have been modified to define a plurality of single level dual mode keys and a plurality of dual level dual mode keys.

26. The keyboard according to claim 24 wherein an LED display area is centrally located within the top row of keys, the LED display area indicating a status of activity.

27. The keyboard according to claim 14 wherein the keys include labels that bear lower-case letters.

28. A keyboard for use with a computer, the keyboard including a surface in a first plane and a surface in a second plane, the first plane substantially perpendicular to the second plane, the keyboard having an array of keys in which some of the keys are actuated by movement substantially perpendicular to the first plane and some of the keys are actuated by movement substantially perpendicular to the second plane, the keyboard also including a platform extending away from the array of keys toward the user and a mounting area centrally formed in the platform between the user and the array of keys.

29. The keyboard according to claim 28 further including a depression in the platform.

30. The keyboard according to claim 28 further comprising an electronic notepad mounted within the mounting area.

31. The keyboard according to claim 28 wherein the array of keys is located such that a user can actuate all keys using the fingers and thumbs of the user's hands without having to move the user's hands from a central hand location.

32. A keyboard for use with a computer, the keyboard comprising:
   a. a plurality of manually actuable character/function keys capable of producing different characters or performing different functions when actuated in combination with other types of keys on the keyboard;
   b. a plurality of manually actuable mode keys;
   c. a plurality of manually actuable service keys;
   d. a key support means for supporting the character/function keys, the mode keys, and the service keys in an array, the array of keys being such that a user can actuate all keys using the fingers of the user's hands without having to move the user's hands from a central hand location;
   e. a platform extending from the key support means;
   f. at least one of said function keys being a tab key and means mounting said tab key to rock in one direction to tab forward and to rock in an opposite direction to tab backward; and
   g. an indented area in the platform.

33. The keyboard according to claim 32 wherein said tab key is located substantially in the center of the keyboard.

34. The keyboard according to claim 32 wherein said tab key rocks from side to side of the keyboard.

* * * * *

UNITED STATES PATENT AND TRADEMARK OFFICE
CERTIFICATE OF CORRECTION

PATENT NO. : 5,880,685
DATED : Mar. 9, 1999
INVENTOR(S) : Weeks

It is certified that error appears in the above-identified patent and that said Letters Patent is hereby corrected as shown below:

The title page should be deleted to appear as per attached title page.

Please delete drawing sheets 1-3 and substitute drawing sheets 1-4 as per attached.

Signed and Sealed this

Fifth Day of October, 1999

Attest:

Q. TODD DICKINSON

Attesting Officer

Acting Commissioner of Patents and Trademarks

United States Patent [19]
Weeks

[11] Patent Number: 5,880,685
[45] Date of Patent: Mar. 9, 1999

[54] COMPUTER KEYBOARD WITH ACCESSORY PLATFORM

[76] Inventor: James A. Weeks, 119 Davenport Dr., Nashville, Tenn. 37217

[21] Appl. No.: 672,381

[22] Filed: May 28, 1996

Related U.S. Application Data

[63] Continuation-in-part of Ser. No. 372,394, Jan. 13, 1995, which is a continuation-in-part of Ser. No. 108,191, Jul. 23, 1993, abandoned.

[51] Int. Cl.$^6$ .................................................. H03K 17/94
[52] U.S. Cl. ........................... 341/22; 200/339; 345/167; 345/168; 364/709.15; 400/485; 400/488
[58] Field of Search ........................ 341/22; 345/157, 345/160, 167, 168; 364/709.15; 200/339, 5 A; 400/485, 488, 489; 455/89, 90, 128, 129, 347, 351, 95

[56] References Cited

U.S. PATENT DOCUMENTS

| | | | |
|---|---|---|---|
| 4,333,097 | 6/1982 | Buric et al. | 345/168 |
| 4,613,247 | 9/1986 | McGunnigle | 400/486 |
| 4,680,577 | 7/1987 | Straayer et al. | 345/168 |
| 4,891,777 | 1/1990 | Lapeyre | 364/709.15 |
| 5,043,721 | 8/1991 | May | 340/825.44 |
| 5,122,786 | 6/1992 | Rader | 341/22 |
| 5,200,913 | 4/1993 | Hawkins et al. | 345/168 X |
| 5,269,004 | 12/1993 | Comerford et al. | 341/22 X |
| 5,318,367 | 6/1994 | Braun | 341/22 |
| 5,372,441 | 12/1994 | Louis | 341/22 |
| 5,416,498 | 5/1995 | Grant | 341/22 |
| 5,469,160 | 11/1995 | Yang | 341/22 |
| 5,476,332 | 12/1995 | Cleveland, Jr. | 345/168 |
| 5,483,235 | 1/1996 | Hanson et al. | 341/22 X |
| 5,502,460 | 3/1996 | Bowen | 345/168 |

FOREIGN PATENT DOCUMENTS

| | | | |
|---|---|---|---|
| 2069197 | 8/1981 | United Kingdom | 341/22 |
| 2125199 | 2/1984 | United Kingdom | 341/22 |
| 18500 | 9/1993 | WIPO | 345/168 |

OTHER PUBLICATIONS

Concert Master™ Keyboard, NMB Technologies, Inc., date unknown.
Microsoft Natural Keyboard, Microsoft, date unknown.
Beausoleil et al., "Compact Keyboard", IBM Tech. Discl. Bull., vol. 13, No. 11, p. 3574, Apr. 1971.

Primary Examiner—Thomas J. Mullen, Jr.
Attorney, Agent, or Firm—Waddey & Patterson; I. C. Waddey, Jr.

[57] ABSTRACT

A keyboard for use with a computer is disclosed. The keyboard has an array of keys made up of four rows such that all keys are accessible by a user using finger and thumb movements of the user's hands without moving the hands from a central location. All modes and functions of the keyboard are accessible using finger movements also in that the character keys on the keyboards are capable of producing different characters or performing different functions when actuated in combination with other mode and function keys on the keyboard. The keyboard has a space bar and an enter key that are accessible by the user's thumbs. The space bar and enter key are actuated by pressing either key horizontally rather than vertically as in standard keyboards. The keyboard also includes dual mode keys which allow the user to access additional modes. This feature expands the capability of the keyboard to interact with more software functions. The keyboard also includes a trackball that is accessible using either of the user's thumbs with its three buttons accessible by the index finger of either hand. The front surface of the trackball lies in a plane perpendicular to the plane of the keyboard. The keyboard also includes visual aids on each key so that the user can correlate a given mode with the function it produces when used in conjunction with a multiple character function key. The keyboard also includes an accessory platform extending from below the array of keys and towards the user. The accessory platform can accommodate an electronic notepad and audio speakers. The keyboard also includes a detachable antenna that can be mounted on the keyboard for use or stored within the keyboard when not in use. The keyboard also includes a microphone mounted within the keyboard.

34 Claims, 4 Drawing Sheets